(12) United States Patent
Ueda

(10) Patent No.: US 8,581,733 B2
(45) Date of Patent: Nov. 12, 2013

(54) PORTABLE ELECTRONIC DEVICE

(75) Inventor: Kenichirou Ueda, Osaka (JP)

(73) Assignee: Icom Incorporated, Osaka (JP)

( * ) Notice: Subject to any disclaimer, the term of this patent is extended or adjusted under 35 U.S.C. 154(b) by 274 days.

(21) Appl. No.: 13/104,144

(22) Filed: May 10, 2011

(65) Prior Publication Data

US 2012/0194345 A1    Aug. 2, 2012

(30) Foreign Application Priority Data

Jan. 27, 2011  (JP) .................................. 2011-015223

(51) Int. Cl.
*G08B 21/00*    (2006.01)

(52) U.S. Cl.
USPC ......... 340/604; 340/602; 340/603; 340/573.6

(58) Field of Classification Search
USPC ........................................................ 340/604
See application file for complete search history.

(56) References Cited

U.S. PATENT DOCUMENTS

| | | | |
|---|---|---|---|
| 5,210,525 A * | 5/1993 | Lennon et al. ................ | 340/604 |
| 6,041,924 A * | 3/2000 | Tajima .......................... | 206/320 |
| 6,355,374 B1 * | 3/2002 | Wirsching ..................... | 429/96 |
| 7,400,917 B2 * | 7/2008 | Wood et al. ................. | 455/575.8 |
| 2010/0308753 A1 * | 12/2010 | Chang .......................... | 315/362 |
| 2012/0043916 A1 * | 2/2012 | Yoshida et al. ............... | 315/363 |

FOREIGN PATENT DOCUMENTS

| | | |
|---|---|---|
| JP | 04-135038 U | 12/1992 |
| JP | 3009867 U | 2/1995 |
| JP | 08-261759 A | 10/1996 |
| JP | 3765110 | 11/1996 |
| JP | 2000-344185 A | 12/2000 |
| JP | 2001-106183 A | 4/2001 |
| JP | 2001-313189 A | 11/2001 |
| JP | 2002-111838 A | 4/2002 |

* cited by examiner

*Primary Examiner* — Kerri McNally
(74) *Attorney, Agent, or Firm* — Muncy, Geissler, Olds & Lowe, PLLC

(57) ABSTRACT

A drop detection part that detects drop of the device into the water, a light emitting body disposed in the housing, and a light-emission control circuit that makes the light emitting body emit light when the drop detection part detects the drop into the water are provided, and the rear face of the housing is made translucent, a lower part of a sealing member sealing the front housing and the rear housing is also made translucent, and a cover part covering the light emitting body is formed on this translucent part.

11 Claims, 3 Drawing Sheets

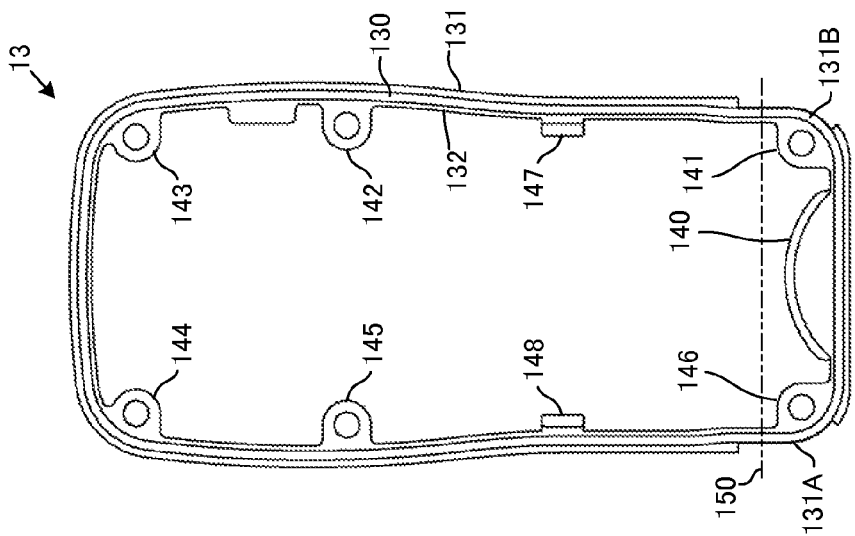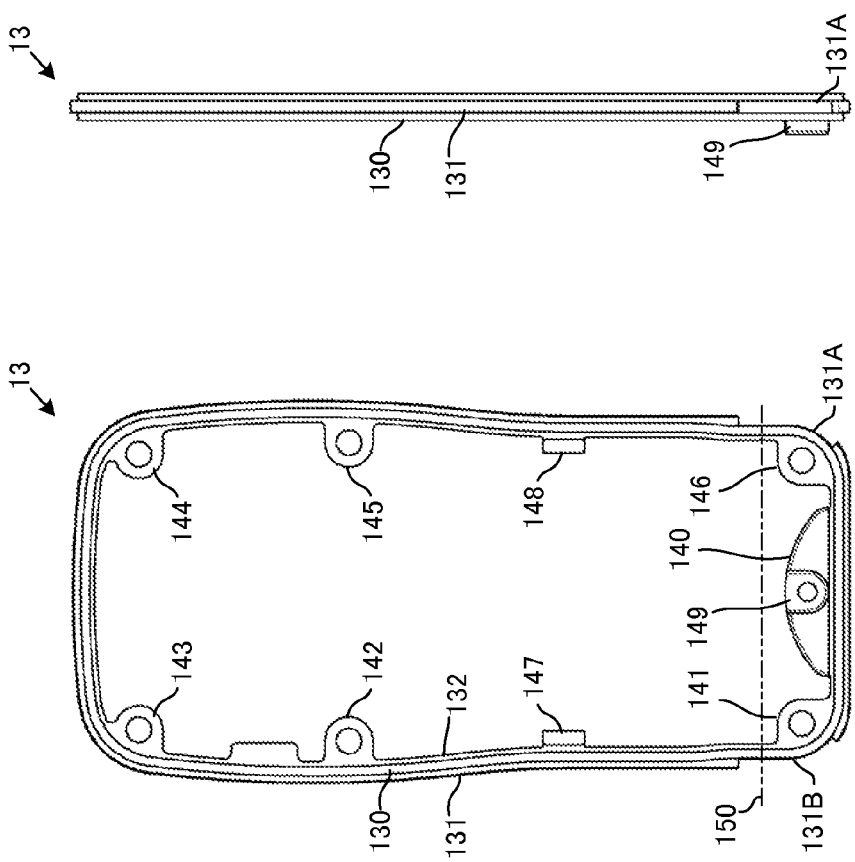

PORTABLE ELECTRONIC DEVICE

CROSS REFERENCE TO RELATED APPLICATION

The present invention is related to, claims priority from, and incorporates by reference Japanese Patent Application No. 2011-015223, filed on Jan. 27, 2011.

TECHNICAL FIELD

The present invention relates to a portable electronic device and particularly to a portable electronic device that can float on water even if it is dropped into the water.

BACKGROUND

There are many portable electronic devices used close to water such as marine transceivers and the like. Since this type of electronic devices can be accidentally splashed with water or dropped into the water, waterproof devices so that water cannot enter the insides have been put into practice. Also, if the device sinks in the water when being dropped into the water, it cannot be recovered. A floating-type device to stay afloat when being dropped into the water is also proposed, as disclosed by Japanese Laid-Open Utility Model Application Publication No. H04-135038.

However, at night or when visibility is poor, even if an electronic device floats on the water surface, it is likely that the device cannot be found. In such case, there has been a problem that the electronic device cannot be recovered even though it is floating on the water.

The present invention has an object to provide a portable electronic device that can be easily found on the water surface even at night or if visibility is poor.

SUMMARY

A portable electronic device of the present invention includes a drop detection part that detects drop of the device into the water, a light emitting body provided inside a housing, and a light-emission control circuit that makes the light emitting body emit light when the drop detection part detects drop into the water and is characterized by that a translucent part is provided in a part of the housing.

In a preferred embodiment of the present invention; the housing has a front housing and a rear housing, and either one of or both of the front housing and the rear housing have translucent parts.

In a preferred embodiment of the present invention, the front housing and the rear housing are joined having a sealing member sandwiched between them, the sealing member has a translucent part partially or on the whole, and a cover part that covers the light emitting body is formed on the translucent part.

In a preferred embodiment of the present invention, the sealing member has a tongue part projecting into the inside of the housing on the translucent part, and the cover part is formed on the tongue part.

In a preferred embodiment of the present invention, the translucent part has such transparency that when the light emitting body is turned on, the light is transmitted, while in a usual time when the light emitting body is turned off, the inside cannot be seen through from the outside of the housing.

According to this invention, since the light emission part emits light when the portable electronic device is dropped into the water, even at night or if visibility is poor, a user can easily find the portable electronic device.

BRIEF DESCRIPTION OF THE DRAWINGS

FIGS. 2A, 2B, and 2C are appearance views of a sealing member of the transceiver.

EXPLANATION OF REFERENCE NUMERALS

"1" transceiver
"11" housing
"12" antenna
"13" sealing member
"13A" translucent part
"16" speaker grill
"18" push-button group
"21A, 22A" projection (of housing)
"35" electrode
"110" front housing
"111" rear housing
"149" LED cover
"181" key top

DETAILED DESCRIPTION

Figure 1C:
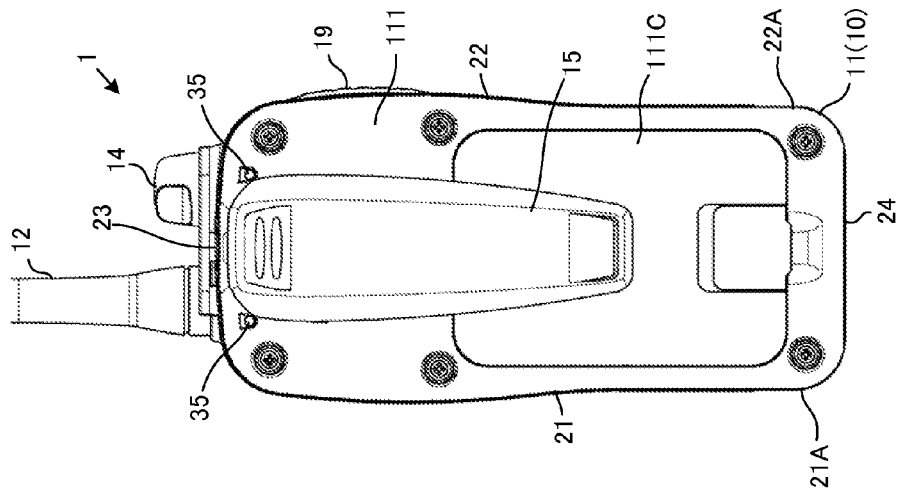
FIGS. 1A, 1B and 1C are appearance views of a transceiver, which is an embodiment of the present invention.
Figure 1B:
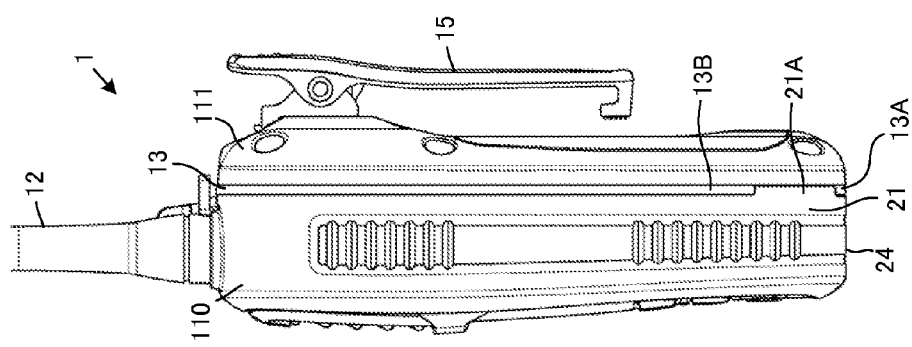
Figure 1A:
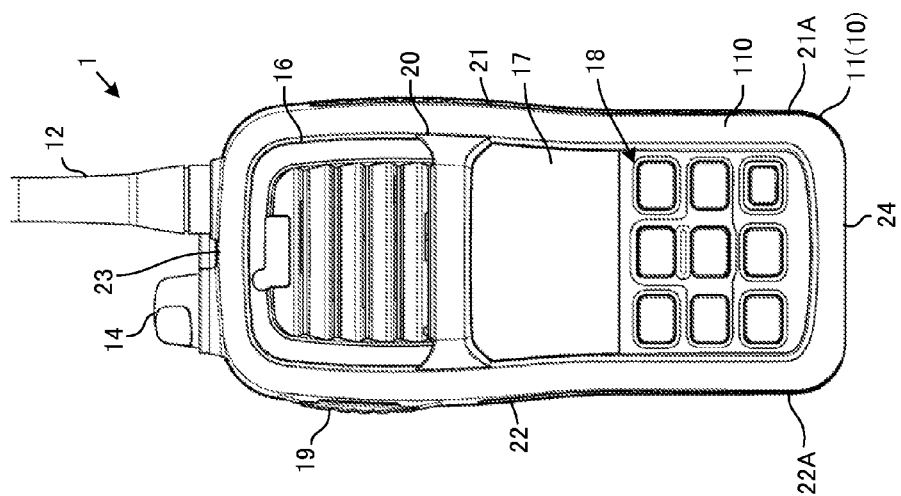
Figure 3:
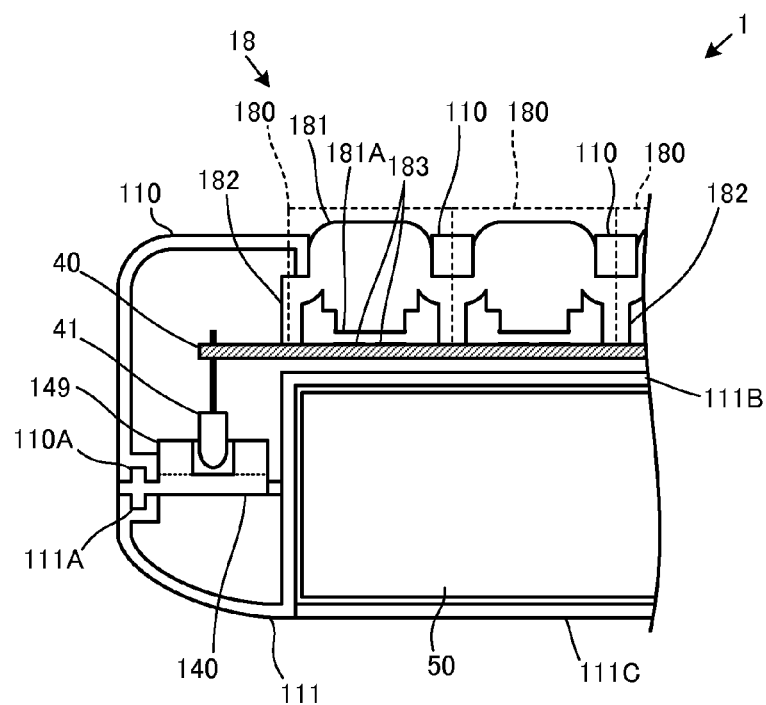
FIG. 3 is an internal structural diagram of a lower part of the transceiver.

FIGS. 1 are appearance views of a transceiver, which is an embodiment of the present invention. FIG. 1A is a front view of the transceiver, FIG. 1B is a left side view of the transceiver, and FIG. 1C is a rear view of the transceiver. Also, FIGS. 2 are appearance views of a sealing member of the transceiver. FIG. 2A is a front view of the sealing member, FIG. 2B is a left side view of the sealing member, and FIG. 2C is a rear view of the sealing member. Also, FIG. 3 is an internal structural diagram of a lower part of the transceiver.

The transceiver 1 is a hand-held device for maritime communications. The transceiver 1 has been reduced in weight as a whole by using a light-weighted and large-capacity lithium ion battery as a power source. Even if the transceiver 1 drops into the water, it does not sink but floats on the water because of the reduced in weight and a waterproof housing 11 of the transceiver 1. And when the transceiver 1 drops into the water, electrodes 35 are connected electrically to each other by being splashed with water and an LED 41 starts flashing. By means of the flashing of the LED 41, the dropped transceiver 1 can be easily found by a user even at night or if visibility is poor.

The transceiver 1 has an appearance having a main body 1 including the housing 11 and an antenna 12 disposed on the upper face of the housing 11. The housing 11 has a front housing 110 and a rear housing 111. The front housing 110 and the rear housing 111 are joined having a sealing member 13 sandwiched between them. The antenna 12 is disposed on the upper face of the housing 11, while being directed upward. The antenna 12 is a rod aerial with a helical wire contained in a resin pipe.

On a front panel 20 of the front housing 110, a speaker grill 16, a display 17, and a push-button group 18 are disposed from the top. A speaker (not shown) is disposed inside the speaker grill 16. On a right side plate 22, a PTT switch 19 is disposed, and on the left side of the antenna 12 on an upper side plate 23, a charging connector 14 covered by a waterproof cap is disposed. The push-button group 18 is, as shown in FIG. 3, assembled from a key mechanism 180 of a plurality of components. The key mechanism 180 consists of a pair of electrodes 183 formed on the front face of a circuit board 40 (See FIG. 3) inside the housing 11 and a key top 181. The key top 181 is molded out of translucent rubber or a soft resin having flexibility and is supported by legs 182 formed on its periphery on the circuit board 40. A conductive film 181A is laid on a bottom face of the key top 181. The push-button group consist of nine push-buttons. The key top 181 and the legs 182 for each push-button are integrally molded and fitted in holes of the front panel 20 of the front housing 110. The key top 181 is elastically deformed by being pressed by a user, the conductive film 181A is brought into contact with the pair of electrodes 183, and the electrodes 183 are electrically conducted.

A clip 15 is disposed at the center of the rear housing 111. A battery case 111B (See FIG. 3) that contains a battery 50 (See FIG. 3) is formed at the center of the lower part of the rear housing 111. On the battery case 111B, a battery case cover 111C is removably provided. The pair of electrodes 35 are placed at right and left on the upper part of the rear housing 111. These electrodes 35 detect drop of the transceiver 1 into water. If these electrodes 35 are electrically conducted by water, the LED 41 (See FIG. 3) flashes. The LED 41 is mounted on the back face of the circuit board 40 inside the housing 11.

The front housing 110 is formed by an opaque resin and includes the substantially planar front panel 20 and a left side plate 21, a right side plate 22, an upper side plate 23, and a bottom side plate 24 rising rearward substantially at a right angle from the peripheral edges of the front panel 20. At an edge of the left side plate 21, the right side plate 22, the upper side plate 23, and the bottom side plate 24, a groove 110A (See FIG. 3) into which the seal member 13 is inserted is formed.

At an edge outside of the groove 110A from the left side plate 21 to the bottom side plate 24, a projection 21A is formed, and at an edge outside of the groove 110A from the right side plate 22 to the bottom side plate 24, a projection 22A is formed. The front housing 110 and the rear housing 111 are assembled having the sealing member 13 sandwiched, the sealing member 13 being exposed between the front housing 110 and the rear housing 111, and the sealing member 13 is hidden from the outside only for the sections of the projections 21A and 22A. FIG. 1B shows only the projection 21A of the left side plate 21, but the projection 22A appears symmetrically with the projection 21A on the edge part of the right side plate 22.

The rear housing 111 is formed by a translucent resin and has a lid shape with upper and lower and right and left peripheral edge rising gently forward from a rear face on which the clip 15 is disposed. And over the entire edge periphery of the rear housing 111, a groove 111A (See FIG. 3) into which the seal member 13 is inserted is formed.

The rear housing 111 is made by black colored translucent resin, and its transparency is such that the inside cannot be seen through in a usual state when the inside of the housing 11 is dark but light is transmitted when an LED 41 inside the housing 11 is turned on.

As shown in FIGS. 2, the sealing member 13 is formed in a ring shape having the substantially same shape as the profile of the housing 11 when seen from the front. The sealing member 13 has a web 130 fitted in the grooves of the front housing 110 and the rear housing 111. And the sealing member 13 has an outer flange 131 projecting outward from the center on the outside face of the web 130, and an inner flange 132 projecting inward from the center on the inside face of the web 130. The outer flange 131 has cut-away parts 131A and 131B which are respectively fitted with the left projection 21A and the right projection 22A of the front housing 110. Also, nine tongues 140 to 148 are formed on the inner flange 132. The web 130 has a uniform thickness. The flange 131 excluding the cut-away parts 131A and 131B and the flange 132 have a uniform thickness thinner than it of the web 130. As will be described later, even in the tongues 140, 147, and 148 which are thicker than the inner flange 132, areas corresponding to the width of the inner flange 132 have the same thickness as the other inner flanges 132. Since the sealing member 13 has a structure of the web 130 and the flanges 131 and 132, the inside of the assembled housing 11 is tightly made waterproof.

Also, the sealing member 13 is divided into upper and lower parts having different colors from each other by a boundary indicated by a two-dot chain line 150. The boundary line 150 is set so as to pass through the cut-away parts 131A and 131B. The lower part from the boundary is milky white translucent part 13A, while the upper part from the boundary is blue opaque part 1313. When the transceiver 1 is assembled, the boundary is hidden behind the projections 21A and 22A, the translucent part 13A is exposed to the bottom side lower than the projections 21A and 22A, and the opaque part 13B is exposed on the upper side than the projections 21A and 22A. As a result, an area where the color becomes cloudy at the boundary between the translucent part 13A and the opaque part 13B is hidden behind the projections 21A and 22A, and beautiful appearance is maintained while two colors of the sealing member 13 are maintained.

In the tongues 140 to 148 formed on the inner flange 132, the tongue 140 provided at the center on the lower side of a ring, which is a region of the translucent part 13A, has a gentle arc shape, and its front has a thickness larger than the other inner flanges 132 (See FIG. 3). On the front side of the tongue 140, an LED cover 149 is further provided. The LED cover 149 is formed in a cylindrical shape into which the LED 41 on the circuit board 40 is fitted when the sealing member 13 is fitted into the groove of the front housing 110. Since the LED 41 is fitted in the LED cover 149, light of the LED 41 of a point light source is diffused by the translucent LED cover 149 and the tongue 140, and is made that of a planar light source. Also, since the tongue 140 is thick, sufficient light diffusion can be realized. This diffused light widely illuminates the lower region of the translucent rear housing 111, makes the lower part of the rear housing 111 shine, and the entire translucent part 13A of the sealing member 13 is made to shine. The shapes of the tongue 140 and the LED cover 149 are not limited to those shown in FIG. 2.

The tongues 141 to 146 are disposed at the four corners and on the upper parts of the right and left sides inside the ring, and have screw holes through which screws for assembling the front housing 110 and the rear housing 111 together are inserted. Also, the tongues 147 and 148 are disposed on the lower side of the right and left sides in the ring, and have tip portions expanded in the thickness larger than the inner flange 132. When the transceiver 1 is assembled by sandwiching the sealing member 13 between the front housing 110 and the rear housing 111, the fixing screws are inserted through the screw holes of the tongues 141 to 146, and the expanded portions of the tongues 147 and 148 project into the inside of the housing 11. As a result, after the transceiver 1 has been assembled, the sealing member 13 is fixed without departing from the housing 11.

Since the front housing 110 and the rear housing 111 are joined sandwiching the sealing member 13 having the above shape between them, intrusion of water through the joined portion between the front housing 110 and the rear housing 111 into the inside of the housing 11 is prevented.

FIG. 3 is a diagram for explaining a partial internal structure of the transceiver 1. This figure is that of the inside of the transceiver 1 seen from the left side. A print wiring board 40 on which various circuits are mounted is disposed on the front side in the housing 11 (inside the front housing 110), and the LED 41 is mounted on the lower end portion thereof. The LED 41 is a self-flashing type LED and its turning-on (flashing)/turning off is controlled by a lighting control circuit shown in FIG. 4. Also, the LED 41 is covered by the LED cover 149 formed on the tongue 140 of the sealing member 13.

As a result, the light of the LED 41, which is a point light source, is diffused, and the entire tongue 140 emits light like a planar light source. The light diffused by the LED cover 149 and the tongue 140 can be visually recognized from the outside through the translucent part 13A of the sealing member 13, the translucent rear housing 111, and the translucent key top 181.

Figure 4:
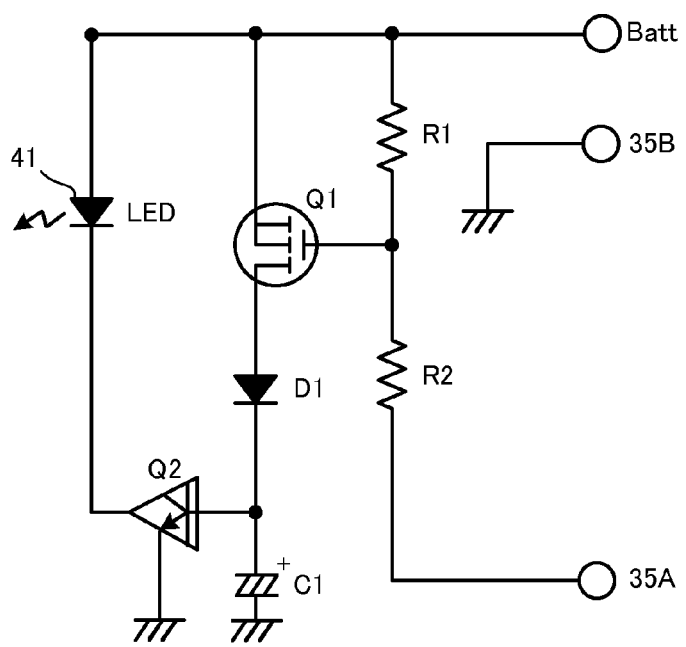
FIG. 4 is a circuit diagram of an LED lighting control circuit of the transceiver.

FIG. 4 is a diagram illustrating a lighting control circuit of the LED 41. This lighting control circuit corresponds to a light-emission control circuit of the present invention. This lighting control circuit is a circuit constituted such that a Pch MOS field-effect transistor (FET) Q1 and an NPN transistor Q2 are turned on when the pair of electrodes 35 (35A and 35B) are electrically conducted each other, and the LED 41 connected between a collector of the transistor Q2 and a power source is made to flash (lighted).

The power source (lithium-ion battery) and this circuit are directly connected to each other without passing through a power switch, and even if the power switch is off, the LED 41 is made to flash if the transceiver 1 is dropped into the water. A resistor R1, a resistor R2 and the pair of electrodes 35 (35A and 35B) are connected in series between the power source and the ground. A connection point between the resistor R1 and the resistor R2 is connected to the gate of the FET Q1. The source of the FET Q1 is connected to the power source, and a forward-direction diode D1 and a capacitor C1 are connected in series between the drain of the FET Q1 and the ground. A connection point between the diode D1 and the capacitor C1 is connected to the base of the transistor Q2. The transistor Q2 is a transistor for digital operation that incorporates a resistor, and a resistor is connected in series to the base. The LED 41 is connected between the collector of the transistor Q2 and the power source, and the emitter of the transistor Q2 is grounded.

When the transceiver 1 is dropped into the water and the electrodes 35A and 35B are electrically conducted to each other, a power voltage divided at the resistors R1 and R2 is applied to the gate of the FET Q1. As a result, the FET Q1 is turned on, and the capacitor C1 is quickly charged through the diode D1. By the charging of the capacitor C1, a base voltage of the transistor Q2 is raised, and the transistor Q2 is turned on. By the turning-on of the transistor Q2, an electric current flows through the LED 41 and the LED 41 is made to flash.

When the transceiver 1 is taken out of the water and the electrical conduction between the electrodes 35A and 35B is shut off, the FET Q1 is turned off, but since the capacitor C1 has been charged close to the power voltage, the transistor Q2 is kept in the ON state until the capacitor C1 is discharged through the base/emitter of the transistor Q2. The capacitor C1 is chosen based on the capacitance so as to keep Q2 in the ON state for 30 to 60 seconds after shut-off of the electrodes 35A and 35B. As a result, even if a user takes up the transceiver 1 out of the water surface in a dark environment, the LED 41 keeps flashing so as not to miss the transceiver.

When the LED 41 is turned on (made to flash), the light is diffused and propagated by the LED cover 149 of the sealing member 13 and the tongue 140, the translucent part 13A of the sealing member 13 is made to shine brightly and also, the light leaks from the rear housing 111 and the key top 181 of the front housing 110 constituted translucently, which can be recognized by a user.

In above embodiments, a self-flashing LED is used as the LED 41, but a normal LED may be used, and a flashing circuit may be disposed outside of the LED separately.

Also, in the above embodiments, the rear housing 111 and the push-button group 18 of the front housing 110 are made translucent, but only either one of them may be made translucent or other spots may be made translucent. Also, only a portion close to the LED 41 (light emitting body) may be made translucent without making the entire rear housing 111 translucent.

In above embodiments, a handy transceiver for maritime communications was explained as an example, but the portable electronic device of the present invention is not limited to the handy transceiver.

Also, the transceiver 1 of above embodiments have a structure which is waterproof and floats on the water (has a specific gravity smaller than water), but the present invention can be also applied to a portable electronic device with the specific gravity equal to or larger than water.

What is claimed is:

1. A portable electronic device comprising:
 a drop detection part that detects drop of the device into the water;
 a light emitting body disposed inside the housing; and
 a light-emission control circuit that makes the light emitting body emit light when the drop detection part detects drop into the water, wherein
 the housing is in a cuboid shape configured with a front surface, a rear surface, a top surface, a bottom surface, a right side surface, and a left side surface,
 a translucent part is provided at least in the rear surface,
 the housing is configured with a front housing and a rear housing,
 the front housing includes the front surface, the top surface, the bottom surface, the right side surface, and the left side surface, and
 the rear housing includes at least the rear surface.

2. The portable electronic device according to claim 1, wherein
 the translucent part has such transparency that when the light emitting body is turned on, the light is transmitted, while in a usual time when the light emitting body is turned off, the inside cannot be seen through from the outside of the housing.

3. A portable electronic device comprising:
 a drop detection part that detects drop of the device into the water;
 a light emitting body disposed inside the housing; and
 a light-emission control circuit that makes the light emitting body emit light when the drop detection part detects drop into the water, wherein
 a translucent part is provided in a part of the housing,
 the housing has a front housing and a rear housing,
 either one of or both of the front housing and the rear housing have translucent parts,
 the front housing and the rear housing are joined having a sealing member sandwiched between them, the sealing member has a translucent part partially or on the whole, and a cover part that covers the light emitting body is formed on the translucent part.

4. The portable electronic device according to claim 3, wherein the sealing member has a tongue part projecting into the inside of the housing on the translucent part, and the cover part is formed on the tongue part.

5. The portable electronic device according to claim 4, wherein the housing is in a cuboid shape configured with a front surface, a rear surface, a top surface, a bottom surface, a right side surface, and a left side surface, the translucent part of the sealing member is provided in a part of the bottom surface, the cover part and the tongue part are formed inside the translucent part of the sealing member.

6. The portable electronic device according to claim 5, wherein the cover part has a recess in which the light emitting body is fit.

7. A portable electronic device comprising:

the housing that is in a cuboid shape configured with a front surface, a rear surface, a top surface, a bottom surface, a right side surface, and a left side surface;

a drop detection part that has a plurality of electrodes and detects drop of the device into the water by sensing electrical connection between the electrodes;

a light emitting body disposed inside the housing; and a light-emission control circuit that makes the light emitting body emit light when the drop detection part detects drop into the water, wherein at least two of the electrodes are disposed on the rear surface of the housing.

8. The portable electronic device according to claim 7, wherein the housing is configured with a front housing including the front surface and a rear housing including the rear surface, a translucent part is provided in a part of the front surface.

9. The portable electronic device according to claim 8, wherein the translucent part in the front surface is key tops.

10. The portable electronic device according to claim 8, wherein another translucent part is provided in a part of the rear surface.

11. The portable electronic device according to claim 7, wherein a translucent part is provided in a part of the bottom surface.

* * * * *